United States Patent
Attaluri et al.

(10) Patent No.: US 10,157,193 B2
(45) Date of Patent: Dec. 18, 2018

(54) SWITCHING BETWEEN A NON-PARTITIONED HASH JOIN AND A PARTITIONED HASH JOIN BASED ON AN AMOUNT OF AVAILABLE MEMORY

(71) Applicant: International Business Machines Corporation, Armonk, NY (US)

(72) Inventors: Gopi K. Attaluri, San Jose, CA (US); Vijayshankar Raman, Sunnyvale, CA (US); David C. Sharpe, Ontario (CA)

(73) Assignee: International Business Machines Corporation, Armonk, NY (US)

( * ) Notice: Subject to any disclaimer, the term of this patent is extended or adjusted under 35 U.S.C. 154(b) by 301 days.

(21) Appl. No.: 15/060,086

(22) Filed: Mar. 3, 2016

(65) Prior Publication Data

US 2017/0255672 A1    Sep. 7, 2017

(51) Int. Cl.
*G06F 17/30* (2006.01)

(52) U.S. Cl.
CPC .... *G06F 17/30283* (2013.01); *G06F 17/3033* (2013.01); *G06F 17/30486* (2013.01); *G06F 17/30498* (2013.01)

(58) Field of Classification Search
CPC combination set(s) only.
See application file for complete search history.

(56) References Cited

U.S. PATENT DOCUMENTS

| | | | |
|---|---|---|---|
| 6,999,967 B1 | 2/2006 | Ghazal et al. | |
| 7,356,542 B2 | 4/2008 | Gupta et al. | |
| 7,624,120 B2 | 11/2009 | Pawar et al. | |
| 7,730,055 B2 | 6/2010 | Bellamkonda et al. | |
| 7,890,541 B2 | 2/2011 | Teng et al. | |
| 8,583,657 B2 | 11/2013 | Shukla | |
| 8,996,464 B2 | 3/2015 | Zhou et al. | |
| 9,135,282 B2 | 9/2015 | Peh et al. | |
| 9,336,275 B2* | 5/2016 | Potapov | G06F 3/0611 |
| 2008/0301124 A1* | 12/2008 | Alves | G06F 17/30442 |
| 2008/0301135 A1* | 12/2008 | Alves | G06F 17/30442 |

(Continued)

OTHER PUBLICATIONS

List of IBM Patents or Patent Applications Treated as Related, Apr. 2017, 1 page.

(Continued)

*Primary Examiner* — Farhan M Syed
(74) *Attorney, Agent, or Firm* — Erik Johnson; SVL IP Law (57) ABSTRACT

A method implemented by at least one processing device, a processing device, and a computer program product are provided for adjusting hash partitions for a hash join operation. An amount of rows within each of an initial number of hash partitions is determined during assignment of respective rows to respective hash partitions. The initial number of hash partitions is adjusted to a final number of hash partitions based on the amount of rows within each of the initial number of hash partitions and an amount of available memory. The adjusting further includes determining the final number of hash partitions based on the amount of rows within each of the initial number of hash partitions and the amount of available memory, and assigning the rows to the final number of hash partitions. The hash join operation is then performed.

9 Claims, 4 Drawing Sheets

(56) References Cited

U.S. PATENT DOCUMENTS

| | | | |
|---|---|---|---|
| 2009/0070785 A1* | 3/2009 | Alvez | G06F 9/541 |
| | | | 719/318 |
| 2009/0070786 A1* | 3/2009 | Alves | G06F 9/541 |
| | | | 719/318 |
| 2009/0119247 A1* | 5/2009 | Bellamkonda | G06F 17/30498 |
| 2014/0122484 A1 | 5/2014 | Jagtiani et al. | |
| 2014/0250142 A1* | 9/2014 | Pradhan | G06F 17/3033 |
| | | | 707/765 |
| 2014/0330801 A1* | 11/2014 | Kaldewey | G06F 17/3033 |
| | | | 707/698 |
| 2014/0337314 A1* | 11/2014 | Potapov | G06F 3/0611 |
| | | | 707/714 |
| 2015/0242451 A1 | 8/2015 | Bensberg et al. | |
| 2015/0293707 A1 | 10/2015 | Zhang | |
| 2016/0191250 A1* | 6/2016 | Bestler | G06F 3/067 |
| | | | 713/168 |
| 2016/0191508 A1* | 6/2016 | Bestler | G06F 3/067 |
| | | | 713/163 |
| 2016/0191509 A1* | 6/2016 | Bestler | G06F 3/067 |
| | | | 713/163 |
| 2016/0378824 A1* | 12/2016 | Li | G06F 17/30445 |
| | | | 707/715 |

OTHER PUBLICATIONS

Eadon et al.; "Supporting Table Partitioning by Reference in Oracle", Proceedings of the 2008 ACM SIGMOD Inter. Conf. On Management of Data, Jun. 9-12, 2008, pp. 1111-1122.
Barber et al.; "Memory Efficient Hash Joins", Proceedings of the VLDB Endowment, vol. 8, No. 4, Dec. 2014, pp. 353-364.

* cited by examiner

SWITCHING BETWEEN A NON-PARTITIONED HASH JOIN AND A PARTITIONED HASH JOIN BASED ON AN AMOUNT OF AVAILABLE MEMORY

BACKGROUND

Present invention embodiments relate to partitioning and de-partitioning hash tables or other data structures for a database hash join operation, and more specifically, to adjusting a quantity of partitions for hash join operations based on an amount of available memory during runtime.

Typically, a number of hash partitions for a hash join operation is increased when memory is constrained. The number of hash partitions is chosen such that each hash partition would fit in available memory. Repartitioning may be implemented in a number of ways. For example, each hash partition that has data that is too large to fit into available memory may be divided into a number of subpartitions. Outer table rows are joined with each subpartition hash table by loading the outer table rows into the available memory. When using this approach, a same subpartition hash table may be loaded into memory many times, or the outer table rows may be scanned multiple times.

An alternative approach involves switching inner and outer leg roles while performing a join against a large hash partition that cannot fit into available memory. Thus, an original inner leg is treated as an outer leg, and an original outer leg is treated as an inner leg. In this approach, a subset of rows of the original outer legs are hashed into hash tables and tuples of the original inner leg are joined with the hash tables The above-mentioned approaches can be very complex and expensive due to the outer leg being much larger than the inner leg in a hash join operation.

SUMMARY

According to embodiments of the present invention, a method, a processing device, and a computer-implemented program product are provided for adjusting hash partitions for a hash join operation. At least one processing device determines an amount of rows within each hash partition of an initial number of hash partitions during assignment of respective rows to respective hash partitions. The initial number of hash partitions is based on static information and an amount of available memory. The initial number of hash partitions is adjusted to a final number of hash partitions based on the amount of rows within each of the initial number of hash partitions and an amount of available memory. The adjusting further includes determining the final number of hash partitions based on the amount of rows within each of the initial number of hash partitions and the amount of available memory, and assigning the rows to the final number of hash partitions. The hash join operation is then performed by the at least one processing device with the final number of hash partitions.

BRIEF DESCRIPTION OF THE DRAWINGS

Generally, like reference numerals in the various figures are utilized to designate like components.

DETAILED DESCRIPTION

Figure 1:
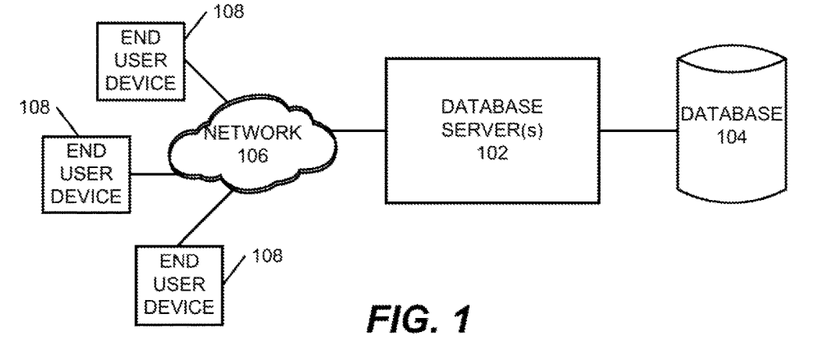
FIG. 1 shows an example of an environment in which various embodiments may be implemented.

With reference now to FIG. 1, an example environment for implementation of embodiments is shown. One or more database servers 102 may have access to relational database 104. Multiple database servers 102 may be configured, in some embodiments, to act as a server farm. One or more database servers 102 may be connected to network 106, which may be a wired or wireless network or a combination thereof. One or more client or end user devices 108 may access database 104 via network 106 and one or more database servers 102.

Network 106 may be implemented by any number of any suitable communications media (e.g., wide area network (WAN), local area network (LAN), Internet, Intranet, etc.). Alternatively, one or more database servers 102 and end user devices 108 may be local to each other, and may communicate via any appropriate local communication medium (e.g., local area network (LAN), hardwire, wireless link, Intranet, etc.).

End user devices 108 enable users to submit queries to one or more database servers 102 to query database 104 and receive query results. Database 104 may store various information for queries and other database system operations. Database 104 may be implemented by any conventional or other database or storage unit, may be local to or remote from one or more servers 102 and end user devices 108, and may communicate via any appropriate communication medium (e.g., local area network (LAN), wide area network (WAN), Internet, hardwired, wireless link, Intranet, etc.). End user devices 108 may present a graphical user (e.g., GUI, etc.) or other interface (e.g., command line prompts, menu screens, etc.) to solicit information from users pertaining to desired data and reports, and may provide the data and the reports.

Figure 2:
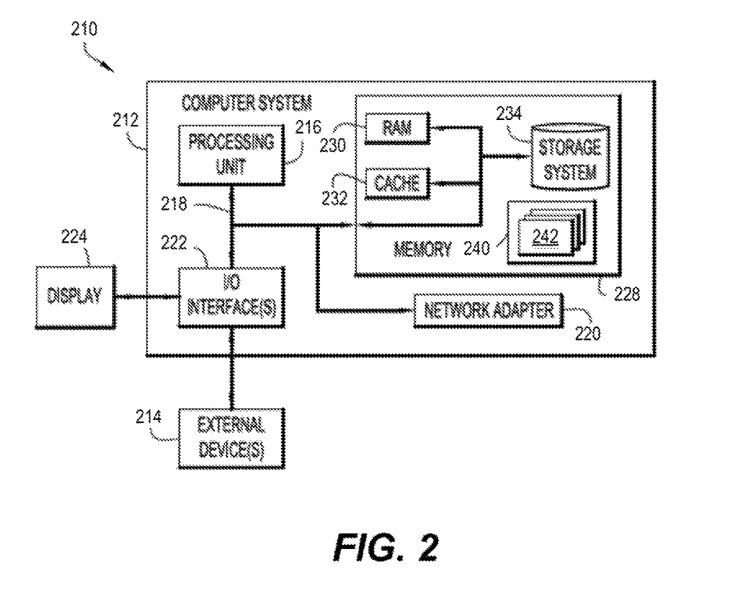
FIG. 2 shows an example of a processing device for implementing various embodiments.

Referring now to FIG. 2, a schematic of an example of a processing device 210, which may implement user device 108 or each of one or more servers 102 of the example environment of FIG. 1, is shown. Processing device 210 is only one example of a suitable processing device for the environment of FIG. 1 and is not intended to suggest any limitation as to the scope of use or functionality of embodiments of the invention described herein. Regardless, processing device 210 is capable of being implemented and/or performing any of the functionality set forth herein.

In processing device 210, there is a computer system 212 which is operational with numerous other general purpose or special purpose computing system environments or configurations. Examples of well-known computing systems, environments, and/or configurations that may be suitable for use with computer system 212 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 212 may be described in the general context of computer system executable instructions, such as program modules, being executed by a computer system. Generally, program modules may include routines, programs, objects, components, logic, data structures, and so on that perform particular tasks or implement particular abstract data types. Computer system 212 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 2, computer system 212 is shown in the form of a general-purpose computing device. Components of computer system 212 may include, but are not limited to, one or more processors or processing units 216, a system memory 228, and a bus 218 that couples various system components including system memory 228 to processor 216.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 212 typically includes a variety of computer system readable media. Such media may be any available media that is accessible by computer system 212, and it includes both volatile and non-volatile media, removable and non-removable media.

System memory 228 can include computer system readable media in the form of volatile memory, such as random access memory (RAM) 230 and/or cache memory 232. Computer system 212 may further include other removable/non-removable, volatile/non-volatile computer system storage media. By way of example only, storage system 234 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 228 may include at least one program product having a set (e.g., at least one) of program modules that are configured to carry out the functions of embodiments of the invention.

Program/utility 240, having a set (at least one) of program modules 242, may be stored in memory 228 by way of example, and not limitation, as well as an operating system, one or more application programs, other program modules, and program data. Each of the operating system, one or more application programs, other program modules, and program data or some combination thereof, may include an implementation of a networking environment. Program modules 242 generally carry out the functions and/or methodologies of embodiments of the invention as described herein.

Computer system 212 may also communicate with one or more external devices 214 such as a keyboard, a pointing device, a display 224, etc.; one or more devices that enable a user to interact with computer system 212; and/or any devices (e.g., network card, modem, etc.) that enable computer system 212 to communicate with one or more other computing devices. Such communication can occur via Input/Output (I/O) interfaces 222. Still yet, computer system 212 can communicate with one or more networks such as a local area network (LAN), a general wide area network (WAN), and/or a public network (e.g., the Internet) via network adapter 220. As depicted, network adapter 220 communicates with the other components of computer system 212 via bus 218. It should be understood that, although not shown, other hardware and/or software components could be used in conjunction with computer system 212. Examples, include, but are not limited to: microcode, device drivers, redundant processing units, external disk drive arrays, RAID systems, tape drives, and data archival storage systems, etc.

Figure 3:
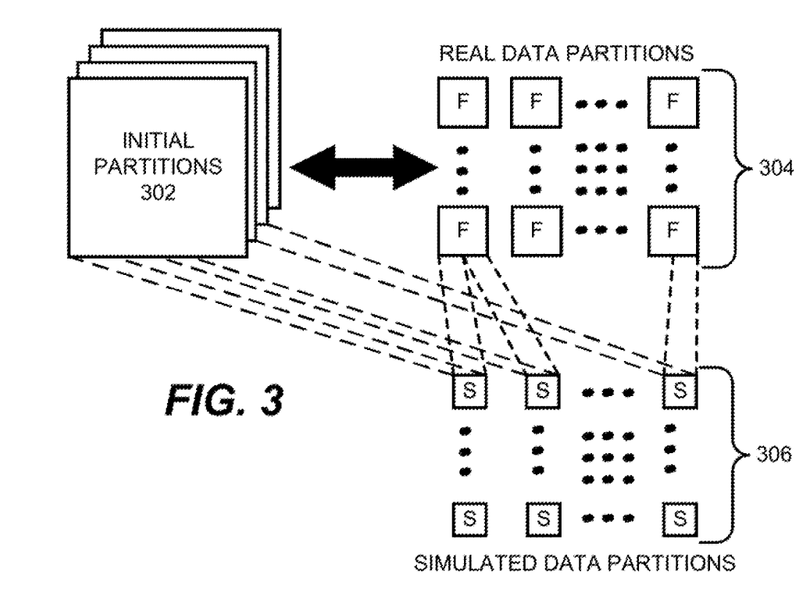
FIG. 3 illustrates operation of embodiments of the invention.

FIG. 3 illustrates example operation of various embodiments. Processing device 210 may be operating with initial hash partitions 302.

Simulated hash partitions 306 may be determined once. In some embodiments, a number of simulated hash partitions 306 may be a maximum number of n simulated hash partitions, with an expectation that each is capable of fitting within available memory. In an embodiment in which n simulated hash partitions are determined, n may be set based on Transmit Lookahead Buffer (TLB) size.

At first, m initial hash partitions 302 may be established (where m is an integer that is greater than or equal to one), inner leg rows may be partitioned into the m initial hash partitions 302, and simulated hash partitions 306 may be identified corresponding to each of the m initial hash partitions while the inner rows are being partitioned. Generally, respective multiple simulated hash partitions 306 correspond to each individual initial hash partition 302. As partitioning is being performed, a respective element of an integer counter array associated with a corresponding simulated hash partition is incremented when a row is added to one of the initial hash partitions. Thus, the integer counter array is used to indicate the number of rows that each simulated hash partition would have. Because multiple simulated hash partitions map to a same initial hash partition, the integer counter array associated with the simulated hash partitions provides a row count at a finer resolution than that of the initial hash partitions.

When partitioning is completed, but before building hash tables, a check is made to determine whether the number of initial hash partitions is suitable for actual rows of data. For each respective initial hash partition 302, a number of rows may be determined by adding the integer array counters corresponding to each of the simulated hash partitions that map to the respective initial hash partition. If all of the inner rows can fit into a single hash table in available memory, then a number of final partitions 304 should be set to one, indicating use of non-partitioned data. Otherwise, the number of final partitions 304 should be large enough to ensure that data for each individual final hash partition 304 fits within available memory. Final partitions 304 of FIG. 3 represent repartitioned initial hash partitions 302.

Figure 4:
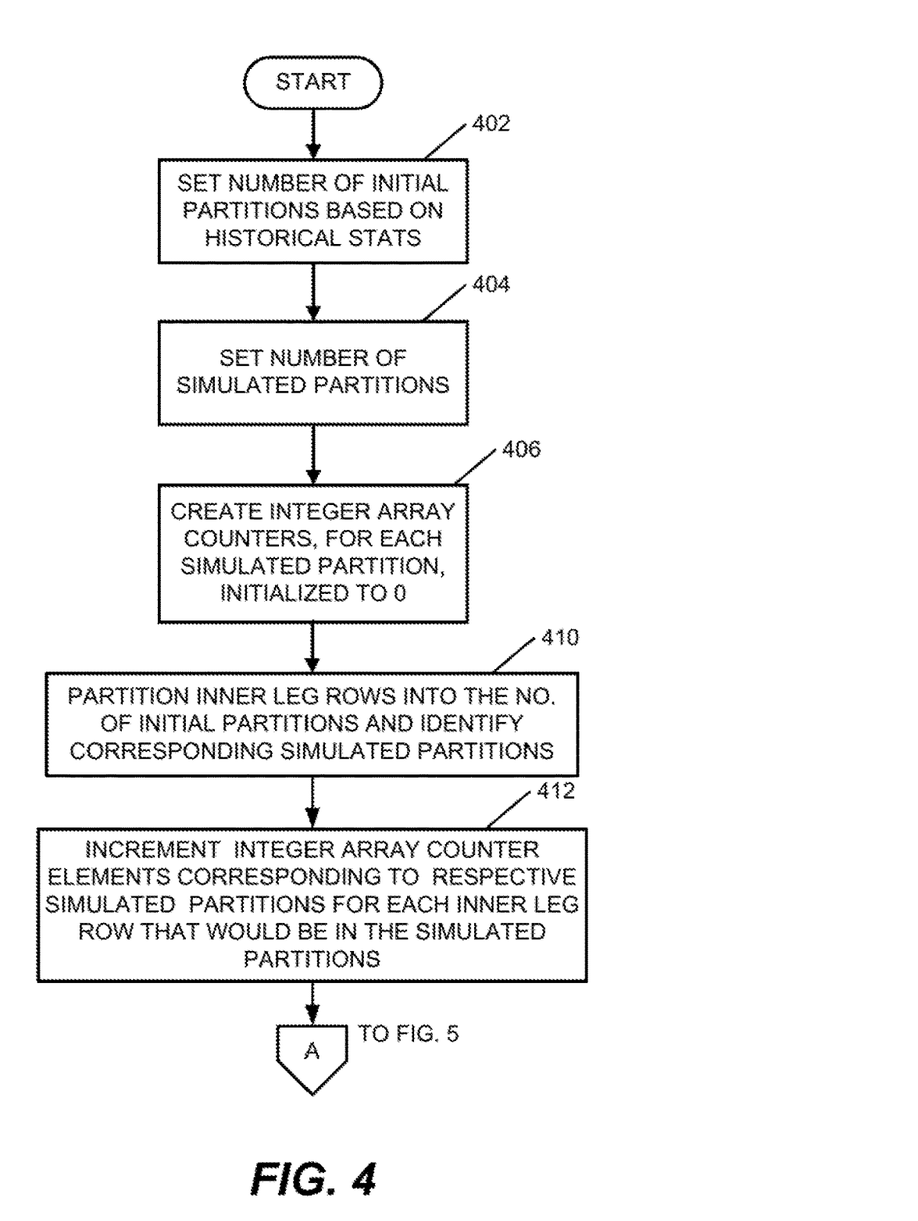
FIGS. 4-5 are flowcharts that explain example processing in various embodiments.

FIG. 4 is a flowchart that explains example processing in various embodiments. The process may begin with setting a number of initial hash partitions based on historical runtime statistics including, but not limited to, an amount of available memory (act 402). Next, a number of simulated hash partitions may be set based on a multiple of a number of initial hash partitions. Next, integer array counters, with a number of elements equal to the number of simulated hash partitions, may be created and initialized to zeros (act 406). Each element of the integer array may correspond to a respective simulated hash partition.

The inner leg rows may be partitioned into the number of initial hash partitions and corresponding simulated hash partitions may be identified (act 410). Integer array elements, corresponding to simulated hash partitions that would include an inner leg row, may be incremented (act 412).

Figure 5:
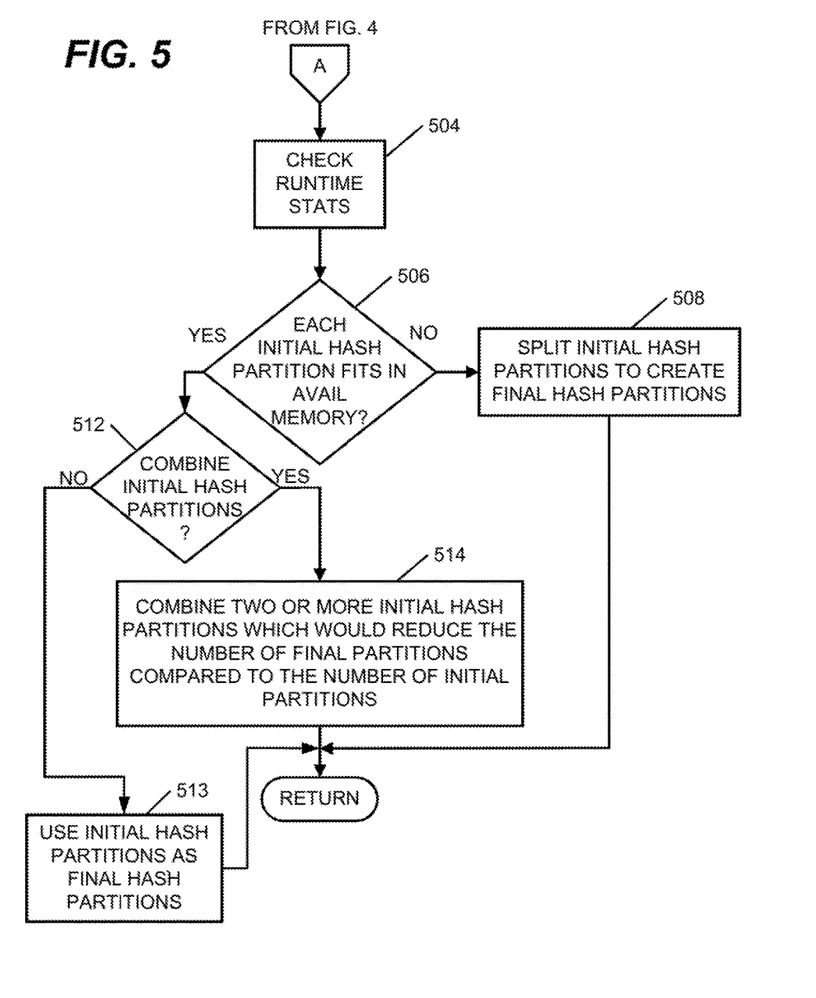

After performing act 412, processing device 210 may then check runtime statistics, including, but not limited to an amount of available memory (504; FIG. 5) to make a determination regarding whether the hash table of each initial hash partition fits within available memory (act 506). If the hash table of each individual hash partition is determined to fit within available memory, then the processing device may determine whether any initial hash partitions can be combined into one or more final hash partitions and fit within available memory (act 512). Starting with initial hash partitions having a smallest number of rows, a number of final hash partitions, may be reduced by combining two or more initial hash partitions into a smaller number of final hash partitions (act 514). In one embodiment, pairs of initial hash partitions may be combined. As long as at least one pair of initial hash partitions exist that can be combined with at least one other initial hash partition to form a final hash partition that fits within available memory, the combining of initial hash partitions into final hash partitions may continue. Any remaining initial hash partitions may be treated as final hash partitions. The process may then return to a calling program. It should be noted that if all initial hash partitions can fit into available memory simultaneously, then the hash table is non-partitioned.

If, during act 512, the determination indicates that initial hash partitions should not be combined then the initial hash partitions may be used as final hash partitions (act 513) and control may be returned to the calling program.

If, during act 506, the determination indicates that some of hash tables of the initial hash partitions do not fit within available memory, then the processing device may split initial hash partitions, starting with initial hash partitions having a largest number of rows, as may be indicated by the corresponding integer array counter elements, into two or more final hash partitions until each resulting final hash partition fits within available memory (act 508). Control then may return to the calling program. Any remaining initial hash partitions may be treated as final hash partitions.

For hash join processing, hash tables may be built in one pass or two passes of an inner leg. Using a one pass method, as the inner leg is scanned, one or more hash tables may be built from resulting rows. The hash tables may need to be dynamically increased if original estimates are too small, thereby hurting performance. In the two pass method, as the inner leg is scanned, output rows may be buffered and may be spilled to a temp buffer if memory is constrained. After scanning the inner leg rows, the buffered rows may be used to build one or more hash tables. The extra pass reduces complexity and improves performance.

The one-pass method or the two-pass method may be used with various embodiments.

For efficiency reasons, when repartitioning is invoked on an initial hash partition that has a hash table with more data than could fit into available memory, repartitioning may also be invoked on other initial hash partitions that are close to having a hash table with more data than could fit into available memory.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software, etc.). These systems may include any types of monitors and input devices (e.g., keyboard, mouse, voice recognition, etc.) to enter and/or view information.

It is to be understood that the software of the present invention embodiments may be implemented in any desired computer language and could be developed by one of ordinary skill in the computer arts based on the functional descriptions contained in the specification and flowcharts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwired, modem connection, wireless, etc.). For example, the functions of the present invention embodiments may be distributed in any manner among the various end-user/client and server systems, and/or any other intermediary processing devices. The software and/or algorithms described above and illustrated in the flowcharts may be modified in any manner that accomplishes the functions described herein. In addition, the functions in the flowcharts or description may be performed in any order that accomplishes a desired operation.

The software of the present invention embodiments may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information. The database system may be implemented by any number of any conventional or other databases, data stores or storage structures (e.g., files, databases, data structures, data or other repositories, etc.) to store information. The database system may be included within or coupled to the server and/or client systems. The database systems and/or storage structures may be remote from or local to the computer or other processing systems, and may store any desired data.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

We claim as our invention:

1. A processing device comprising:
at least one processor;
a memory; and
a communication bus connecting the at least one processor with the memory, wherein the memory has stored therein instructions, which when executed by the at least one processor cause the processing device to perform a method comprising:
creating simulated hash partitions, each hash partition of an initial number of hash partitions corresponding to a respective plurality of simulated hash partitions;
determining an amount of rows of each of the simulated hash partitions;
determining an amount of rows within each respective hash partition of the initial number of hash partitions, the determined amount of rows of the each respective hash partition being based on partitioning inner leg rows of a hash join operation into the initial number of hash partitions, the initial number of hash partitions being based on static information and a historical amount of available memory;
adjusting the initial number of hash partitions to a final number of hash partitions based on the amount of rows within each of the initial number of hash partitions and an amount of available memory at runtime, the adjusting further comprising:
determining the final number of hash partitions based on the amount of rows within each of the initial number of hash partitions and the amount of available memory at runtime, the determining the final number of hash partitions further comprising:
when each of the initial number of hash partitions fits into the amount of available memory at runtime, performing:
combining ones of the initial number of hash partitions when the combined ones of the initial number of hash partitions are determined to fit into the amount of available memory at runtime, resulting in the final number of hash partitions being less than the initial number of hash partitions, thereby increasing processing performance during the hash join operation by decreasing a frequency at which respective hash partitions are loaded into the memory; and
when at least one of the hash partitions does not fit into the amount of available memory at runtime, performing:
increasing an amount of hash partitions to the final number of hash partitions, the final number being larger than a current number of hash partitions so that each of the final number of hash partitions fits into the amount of available memory at runtime; and
performing the hash join operation with the final number of hash partitions.

2. The processing device of claim 1, wherein the determined amount of rows of the each respective hash partition is based on the determined amount of rows of the corresponding simulated hash partitions.

3. The processing device of claim 1, wherein an amount of rows corresponding to each of the final number of hash partitions is based on the determined amount of rows of each of the corresponding simulated hash partitions.

4. The processing device of claim 2, wherein the final number of hash partitions is one hash partition.

5. The processing device of claim 1, wherein each of the final number of hash partitions includes a respective distinct hash table.

6. A computer program product comprising:
a computer readable storage medium having computer readable program code embodied therewith for execution on a processing system, the computer readable program code being configured to be executed by the processing system to:
create simulated hash partitions, each hash partition of an initial number of hash partitions corresponding to a respective plurality of simulated hash partitions;
determining an amount of rows of each of the simulated hash partitions;
determine an amount of rows within each respective hash partition of the initial number of hash partitions, the determined amount of rows of the each respective hash partition being based on partitioning inner leg rows of a hash join operation into the initial number of hash partitions, the initial number of hash partitions being based on static information and a historical amount of available memory;
adjust the initial number of hash partitions to a final number of hash partitions based on the amount of rows within each of the initial number of hash partitions and an amount of available memory at runtime, the adjusting further comprising:

determine the final number of hash partitions based on the amount of rows within each of the initial number of hash partitions and the amount of available memory at runtime, the determining the final number of hash partitions further comprising:

when each of the initial number of hash partitions fits into the amount of available memory at runtime:

combine ones of the initial number of hash partitions when the combined ones of the initial number of hash partitions are determined to fit into the amount of available memory at runtime, resulting in the final number of hash partitions being less than the initial number of hash partitions, thereby increasing processing performance during the hash join operation by decreasing a frequency at which respective hash partitions are loaded into the memory; and when at least one of the hash partitions does not fit into the amount of available memory at runtime:

increase an amount of hash partitions to the final number of hash partitions, the final number being larger than a current number of hash partitions so that each of the final number of hash partitions fits into the amount of available memory at runtime; and perform the hash join operation with the final number of hash partitions.

7. The computer program product of claim 6, wherein the determined amount of rows of the each respective hash partition is based on the determined amount of rows of the corresponding simulated hash partitions.

8. The computer program product of claim 6, wherein an amount of rows corresponding to each of the final number of hash partitions is based on the determined amount of rows of each of the corresponding simulated hash partitions.

9. The computer program product of claim 6, wherein each of the final number of hash partitions includes a respective distinct hash table.

* * * * *